United States Patent [19]

Kneller et al.

[11] Patent Number: 4,604,211

[45] Date of Patent: Aug. 5, 1986

[54] ACRYLIC ACID-SODIUM VINYLSULFONATE-VINYL ACETATE TERPOLYMER AND USE THEREOF AS A DISPERSANT

[75] Inventors: James F. Kneller, LaGrange Park; John R. Hurlock, Hickory Hills, both of Ill.

[73] Assignee: Nalco Chemical Company, Oak Brook, Ill.

[21] Appl. No.: 696,227

[22] Filed: Jan. 29, 1985

[51] Int. Cl.$^4$ ................................................. C02F 5/10
[52] U.S. Cl. ..................................... 210/701; 252/180; 252/395; 422/17
[58] Field of Search ............................ 210/698–701; 252/180, 181, 391, 395; 422/17; 526/287, 317, 318

[56] References Cited

U.S. PATENT DOCUMENTS

| | | | |
|---|---|---|---|
| 3,080,264 | 3/1963 | Zimmie et al. ......................... | 134/22 |
| 3,085,916 | 4/1963 | Zimmie et al. ......................... | 134/22 |
| 3,419,502 | 12/1968 | Newman ............................... | 252/180 |
| 3,492,243 | 1/1970 | Newman et al. ...................... | 252/364 |
| 3,658,710 | 4/1972 | Puckorius et al. .................... | 252/87 |
| 3,682,224 | 8/1972 | Bleyle ................................... | 210/701 |
| 3,699,048 | 10/1972 | Krueger et al. ....................... | 210/701 |
| 3,879,288 | 4/1975 | Siegele ................................. | 252/180 |
| 4,029,577 | 6/1977 | Godlewski et al. ................... | 252/180 |
| 4,048,066 | 11/1977 | Cuisia et al. .......................... | 252/180 |
| 4,143,222 | 3/1979 | Goretta et al. ........................ | 526/64 |
| 4,196,272 | 4/1980 | Goretta et al. ........................ | 526/64 |
| 4,288,327 | 9/1981 | Godlewski et al. ................... | 210/698 |
| 4,331,792 | 5/1982 | Goretta et al. ........................ | 526/229 |
| 4,374,733 | 2/1983 | Snyder et al. ......................... | 210/701 |
| 4,457,847 | 7/1984 | Lorenc et al. ......................... | 210/701 |
| 4,532,048 | 7/1985 | Amjad et al. ......................... | 210/701 |

FOREIGN PATENT DOCUMENTS 1414964 11/1975 United Kingdom ................ 210/699

OTHER PUBLICATIONS

"Small-Scale Short-Term Methods of Evaluating Cooling Water Treatments... Are They Worthwhile?" by Reed & Nass, Nalco Chemical Co., presented at the 36th Annual Meeting of the International Water Conference, Pittsburgh, PA, Nov. 4–6, 1975.

*Primary Examiner*—Peter Hruskoci
*Attorney, Agent, or Firm*—John G. Premo; Donald G. Epple

[57] ABSTRACT

Terpolymers of acrylic acid, sodium vinylsulfonate and vinyl acetate are disclosed. These materials are effective dispersants for industrial water systems.

10 Claims, No Drawings

ACRYLIC ACID-SODIUM VINYLSULFONATE-VINYL ACETATE TERPOLYMER AND USE THEREOF AS A DISPERSANT

INTRODUCTION

Various water-soluble vinyl addition polymers are known in the art as dispersants for aqueous systems. The evolution of materials of this type has ranged from hydrolyzed polyacrilonitrile, see U.S. Pat. No. 3,419,502, Newman, and U.S. Pat. No. 3,492,243, Newman et al, and acrylamide-acrylic acid copolymers, see for example U.S. Pat. No. 3,080,264, Zimmie et al, U.S. Pat. No. 3,085,916, Zimmie et al, and U.S. Pat. No. 3,658,710, Puckorias et al.

Recent developments in dispersant technology have suggested incorporating into the polymer chain a strongly anionic group which increases the dispersancy of the molecule and at the same time imparts to the molecule a tendency to reduce the ability of scale-forming agents to precipitate in industrial water systems. Exemplary polymers of this type include acrylic acid-vinylsulfonate copolymers such as those presented in U.S. Pat. No. 3,879,288, copolymers of styrene sulfonic acid with acrylic or methacrylic acids such as those found in U.S. Pat. No. 4,048,066, and sulfonated styrene maleic anhydride copolymers such as those exemplified in U.S. Pat. No. 4,288,327.

Other recently developed dispersants for industrial water treatment applications include copolymers of acrylic acid with hydroxyalkyl lower acrylates such as those found in U.S. Pat. No. 4,029,577, and the use of copolymers of sulfonated styrene sulfonic acid with hydroxyalkyl acrylates such as those found in U.S. Pat. No. 4,374,733.

While many of the currently available commercial materials, provide good dispersancy when added to industrial water systems, notably cooling water systems, their ability to act to prevent deposits and keep corrosion rates low in such systems has not been satisfactory. It is accordingly an object of this invention to provide to the art a new class of water-soluble vinyl addition polymers useful as dispersants in aqueous systems.

A further object of this invention is to provide to the art a unique terpolymer system having excellent dispersive, corrosion control, and deposit inhibition characteristics when employed in industrial water systems.

It is a still further object of this invention to provide to the art a unique terpolymer of acrylic acid or its water-soluble salts, vinylsulfonate and its water-soluble salts, and vinyl acetate or other vinyl esters.

Further objects will be described hereinafter.

THE INVENTION

This invention is directed to a water-soluble vinyl addition polymer of acrylic acid or its alkali metal or ammonium salts, vinyl sulfonate or its alkali metal or ammonium salts, and vinyl acetate or vinyl esters.

While for the sake of brevity acrylic acid is referred to herein as acrylic acid it should be noted that this term is inclusive of water-soluble salts of acrylic acid, methyacrylic acid and water-soluble salts of methacrylic acid.

Vinyl esters which may be used include those in which the acyl portion of the ester contains two to eight carbon atoms. In addition, the isopropenyl esters may also be used. Thus the general structure of the ester monomer is represented by the following structure:

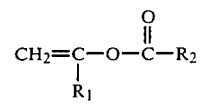

wherein,
$R_1 = H, CH_3$
$R_2 = C_1-C_7$ alkyl

The weight ratio of the three monomers employed to make the terpolymers of this invention should generally be from 40-90 percent acrylic acid, 5-40 percent sodium vinyl sulfonate, and 5-40 percent vinyl acetate. Preferably, the polymers of this invention will contain from 40-80 percent acrylic acid, 10-40 percent sodium vinylsulfonate, and 10-40 percent vinyl acetate.

The polymers can be prepared by conventional solution polymer means, or may be made by the method disclosed in U.S. Pat. Nos. 4,143,222, 4,196,272, and 4,331,792, all of which are hereinafter incorporated by reference.

The molecular weights of the polymers useful in this invention vary over a considerable range. While polymers having a molecular weight of from 500-100,000 which are water soluble are within the scope of this invention, preferred materials having increased activity are obtained in a molecular weight range of 1,500-50,000 as determined by gel permeation chromotography. A most preferred molecular weight is in the area of from 2,000-25,000.

Due to the varying reactivity ratios of the monomers employed in this invention, it has been found, surprisingly, that the incorporation of sodium vinylsulfonate, a difficult to polymerize monomer, increased at lower pH's. It is therefore preferred to prepare the compositions of this invention at pH values as low as 2.0. pH values as high as 5.6 have, however, been tried with satisfactory results.

While as stated earlier, the polymers may be polymerized in a conventional solution polymerization technique, they may also be polymerized using the method disclosed in U.S. Pat. No. 4,331,792. The polymers of this invention are generally prepared in the presence of oxidation-reduction catalysts such as an ammonium persulfate-sodium bisulfite pair, although other free radical catalysts such as peroxides, azo compounds, etc. may be employed.

The polymers of this invention have unique dispersancy qualities when employed in industrial water systems. These industrial water systems include both open and closed cooling water systems, process water systems, boiler waters, and the like.

The novel terpolymers of this invention are advantageously employed as dispersants for mud, silt, calcium carbonate, iron oxide, or alluvium in industrial water supplies. When employed in this application, be it in boiler water, open cooling systems, closed cooling systems, or once-through cooling systems, the polymer is generally added at a level from 1-100, and preferably 1-50 ppm in the water to be treated. Most preferably, from 1-25 ppm of the polymer is employed. The polymers of this invention by their effective dispersing action, reduce corrosion and deposit formation on metals in contact with industrial water so treated.

In order to better illustrate the novelty of this invention, the following examples are presented.

EXAMPLE I

Using the polymerization reactor generally described in U.S. Pat. Nos. 4,143,222, 4,196,272 and 4,331,792, a polymer according to the invention was prepared. The material was a terpolymer containing 61 percent by weight acrylic acid, 24 percent sodium vinyl sulfonate, 15 percent by weight vinyl acetate.

To accomplish this polymerization, three separate solutions were prepared. The monomer solution contained 707.6 grams of acrylic acid, 1,113.6 grams of a 25 percent by weight aqueous solution of sodium vinyl sulfonate, and 174.0 grams of vinyl acetate. pH was adjusted to between 3.5–3.6 with 88.3 grams of 50 percent by weight sodium hydroxide.

A first terpolymer catalyst solution contained 836.7 grams of water and 163.3 grams of soldium metabisulfite.

A second catalyst solution contained 891.1 grams of water and 108.9 grams of ammonium persulfate.

The monomer solution was preheated to 220° F. and upon mixing with the two catalyst solutions, the temperature fell to 136° F. before the polymerization was initiated. The reaction reached a maximum temperature of 274° F. during polymerization. A terpolymer containing 23.78 percent solids and having a molecular weight of 4218 by gel permeation chromotography was obtained. Residual monomer in the final material was low at 0.08 percent acrylic acid, 0.55 percent soldium vinyl sulfonate, and 0.15 percent vinyl acetate.

During the polymerization some hydrolysis of vinyl acetate had occurred and as a result, 0.21 percent acetaldehyde as well as 1.4 percent acetic acid were present. This material was tested in a variety of applications, as were other terpolymers of this invention which were prepared in essentially the same manner.

EXAMPLE II

Other terpolymers prepared in a similar manner as Example I include a 56 percent by weight acrylic acid, 24 percent sodium vinyl sulfonate, and 20 percent vinyl acetate terpolymers having a molecular weight of 3520 (hereinafter designated Example II-A). A 66 percent acrylic acid, 24 percent sodium vinyl sulfonate, and 10 percent vinyl acetate having a molecular weight of 12,686 (hereinafter designated Example II-B).

EXAMPLE III

Iron oxide dispersancy tests were conducted on Examples II-A and II-B above and compared against a commercially available copolymer of sulfonated styrene and maleic anhydride which is used in commercial cooling water corrosion and scale control products, Versa TL-4, available from National Starch and Chemical Corporation. Scoring Versa TL-4 as having 100 percent efficiency. Example II-A gave a result of 137 percent efficiency, Example I gave a result of 105 percent efficiency, and Example II-B gave a result of 86 percent effficiency as seen in Table I.

The test results in Table I also show that acrylic acid-sodium vinyl sulfonate copolymers are relatively poor dispersants for iron oxide while terpolymers II-A and I are good dispersants for iron oxide. (See Example IV.)

EXAMPLE IV

Test results in Table I show that acrylic acid-sodium vinyl sulfonate-vinyl acetate terpolymers are good calcium carbonate dispersants. Dispersancy ratings are scored with Versa TL-4 set equal to 100 percent efficiency. Example II-A then has 148 percent and Example I has 144 percent efficiency. These two terpolymers also are more efficient than acrylic acid-sodium vinyl sulfonate copolymers.

EXAMPLE V

The samples from II-A were evaluated to determine their dispersancy properties when substituted in the place of Versa TL-4 in a commercially available cooling water product. The polymers of the invention were substituted for equal parts of the Versa TL-4, a sulfonated styrene maleic anhydride material available from the National Starch and Chemical Corporation. The method used is generally described in the paper "Small-Scale Short-Term Methods of Evaluating Cooling Water Treatments . . . Are They Worthwhile?", by D. T. Reed and R. Nass, Nalco Chemical Company, presented at the 36th Annual Meeting of the International Water Conference, Pittsburgh, Pa. Nov. 4–6, 1975.

Results are found in Table II.

TABLE I

IRON OXIDE AND CALCIUM CARBONATE DISPERSANCY OF ACRYLIC ACID-SODIUM VINYL SULFONATE-VINYL ACETATE TERPOLYMER

| SAMPLE NUMBER | Mw (GPC) | % Wt. COMPOSITION | | | % DISPERSANCY* | |
|---|---|---|---|---|---|---|
| | | AA | SVS | VA | $Fe_2O_3$ | $CaCO_3$ |
| Example II-A | 3,520 | 56 | 24 | 20 | 137 | 148 |
| Example I | 4,218 | 61 | 24 | 15 | 105 | 144 |
| — | 12,120 | 76 | 24 | — | 85 | 58 |
| — | 5,060 | 80 | — | 20 | 76 | 95 |
| — | 3,940 | 70 | 30 | — | 87 | 111 |
| Versa TL-4 | 10,000 | | | | 100 | 100 |
| Example II-B | 12,686 | 66 | 24 | 10 | 86 | — |

*Relative to Versa TL-4 = 100%

TABLE II

PERFORMANCE OF ALTERNATE TERPOLYMERS TO VERSA TL-4 IN COOLING WATER PROGRAM
(Synthetic Water #3, Basin 100° F., tubes heated to create 10° F., TDS-2100 nominal, 20 liters water, flow 2 gpm, pH control none - pH rises to 9.2, tubes - 6 mild steel and 2 Admiralty)

| | CORROSION - mpy* | | | | DEPOSIT - mg* | | | | |
|---|---|---|---|---|---|---|---|---|---|
| | MILD STEEL | | ADMIRALTY | | MILD STEEL | | ADMIRALTY | | |
| POLYMER | STD. COND. | WITH Fe | STD. COND. | WITH Fe | STD. COND. | WITH Fe | STD. COND. | WITH Fe | NOTES |
| Example II-A | 1.2 | 2.5 | 0.16 | 0.8 | 165 | 180 | 26 | 125 | 13.3% active, formulation |
| Versa TL-4 | 1.3 | — | 0.44 | — | 233 | — | 62 | — | 7.5% active, formulation |
| Versa TL-4 | 1.5 | — | 0.34 | — | 477 | — | 55 | — | 7.5% active, |

TABLE II-continued
PERFORMANCE OF ALTERNATE TERPOLYMERS TO VERSA TL-4 IN COOLING WATER PROGRAM
(Synthetic Water #3, Basin 100° F., tubes heated to create 10° F., TDS-2100 nominal,
20 liters water, flow 2 gpm, pH control none - pH rises to 9.2,
tubes - 6 mild steel and 2 Admiralty)

| | CORROSION - mpy* | | | | DEPOSIT - mg* | | | | |
|---|---|---|---|---|---|---|---|---|---|
| | MILD STEEL | | ADMIRALTY | | MILD STEEL | | ADMIRALTY | | |
| POLYMER | STD. COND. | WITH Fe | STD. COND. | WITH Fe | STD. COND. | WITH Fe | STD. COND. | WITH Fe | NOTES |
| | | | | | | | | | formulation |

*Represents average value for data obtained.

Examples I and II-A were again evaluated in a test similar to that used in Example V substituting the experimental polymers in question for Versa TL-4. Corrosion and deposit results are shown in the attached Table III. Results indicate the ability of these polymers to reduce corrosion and scale as compared to Versa TL-4.

The above data is believed to show the improved performance of polymers of this type in industrial applications.

TABLE III
PILOT COOLING TOWER TESTS
ACRYLIC ACID-SODIUM VINYL
SULFONATE-VINYL ACETATE TERPOLYMERS

| POLYMER SAMPLE NO. | CORROSION (MPY) | | DEPOSIT (MG.) | | NOTES |
|---|---|---|---|---|---|
| | MILD STEEL | ADMIRALTY | MILD STEEL | ADMIRALTY | |
| II-A | 1.2 | 0.16 | 165 | 26 | 13.3 ppm* |
| II-A | 1.6 | 0.32 | 687 | 107 | 11 ppm* |
| I | 2.3 | 0.21 | 609 | 33.5 | 7.5 ppm* |
| I | 1.5 | 0 | 426 | 26 | 11 ppm* |
| Versa TL-4 | 1.3 | 0.44 | 233 | 62 | 7.5 ppm* |
| Versa TL-4 | 1.5 | 0.34 | 477 | 55 | 7.5 ppm* |

*Active in commercial cooling water product formulation.

Having thus described my invention, I claim:

1. A method for dispersing organic and inorganic constituents including iron oxide in industrial water systems which comprises adding to said water systems an effective dispersive amount of a water-soluble terpolymer comprising in percentages by weight:
   A. 40-90 percent acrylic acid;
   B. 5-40 percent sodium vinyl sulfonate, and,
   C. 5-40 percent of a monomer having the formula:

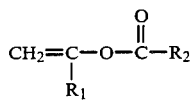

wherein,
   $R_1 = H, CH_3$
   $R_2 = C_1-C_7$ alkyl;
   said terpolymer having a molecular weight of from 1,500 to 100,000.

2. A method for dispersing organic and inorganic constituents including iron oxide in industrial water systems which comprises adding to said water systems an effective dispersive amount of a water-soluble terpolymer comprising in percentages by weight:
   A. 40-90 percent acrylic acid;
   B. 5-40 percent sodium vinyl sulfonate, and
   C. 5-40 percent vinyl acetate, said terpolymer having a molecular weight of from 1,500-50,000.

3. The method of claim 1 wherein from 1-15 ppm of the terpolymer are added to such industrial water systems.

4. A method for the control of corrosion of metal parts in contact with industrial waters which comprises adding to the industrial water an effective corrosion inhibiting amount of a water-soluble terpolymer comprising in percentages by weight:
   A. 40-90 percent acrylic acid;
   B. 5-40 percent sodium vinyl sulfonate, and,
   C. 5-40 percent of a monomer having the formula:

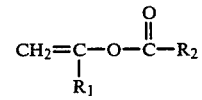

wherein,
   $R_1 = H, CH_3$
   $R_2 = C_1-C_7$ alkyl;
   said terpolymer having a molecular weight of from 1,500 to 100,000.

5. A method for the control of corrosion of metal parts in contact with industrial waters which comprises adding to the industrial water an effective corrosion inhibiting amount of a water-soluble terpolymer comprising in percentages by weight:
   A. 40-90 percent acrylic acid;
   B. 5-40 percent sodium vinyl sulfonate, and
   C. 5-40 percent vinyl acetate, said terpolymer having a molecular weight of from 1,500-50,000.

6. A method for the control of corrosion of metal parts in contact with industrial waters which comprises adding to the industrial water an effective amount of the water-soluble terpolymer of claim 5 wherein the terpolymer has a molecular weight ranging between about 2,000-25,000.

7. A method for the control of corrosion of metal parts in contact with industrial waters which comprises adding to the industrial water an effective corrosion inhibiting amount of a water-soluble terpolymer comprising in percentages by weight:
   A. 40-80 percent acrylic acid,
   B. 10-40 percent sodium vinyl sulfonate, and
   C. 10-40 percent vinyl acetate.

8. A method for dispersing iron oxide and calcium carbonate in industrial water systems which comprises adding to said water systems an effective dispersive amount of a water-soluble terpolymer composition comprising in percentages by weight:
   A. 40-90 percent acrylic acid;
   B. 5-40 percent sodium vinyl sulfonate, and, C. 5-40 percent of a monomer having the formula:

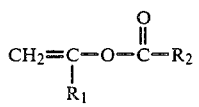

wherein,
$R_1 = H, CH_3$
$R_2 = C_1$-$C_7$ alkyl, and wherein
said terpolymer has a molecular weight of from 1,500 to 100,000.

9. A method for dispersing iron oxide and calcium carbonate in industrial water systems which comprises adding to said water systems an effective amount of a water-soluble terpolymer composition comprising in percentages by weight:
   A. 40-90 percent acrylic acid;
   B. 5-40 percent sodium vinyl sulfonate, and,
   C. 5-40 percent vinyl acetate, said terpolymer having a molecular weight of from 1,500-50,000.

10. A method for dispersing organic or inorganic constituents including iron oxide in industrial water systems which comprises adding to said water systems an effective dispersive amount of a terpolymer composition comprising in percentages by weight:
   A. 40-80 percent acrylic acid,
   B. 10-40 percent sodium vinyl sulfonate, and
   C. 10-40 percent vinyl acetate, and wherein the molecular weight of the terpolymer ranges between about 2,000-25,000.

* * * * *